US011188501B1

(12) United States Patent
Giridharan et al.

(10) Patent No.: US 11,188,501 B1
(45) Date of Patent: Nov. 30, 2021

(54) TRANSACTIONAL AND BATCH-UPDATED DATA STORE SEARCH

(71) Applicant: Amazon Technologies, Inc., Seattle, WA (US)

(72) Inventors: Vamsi Krishna Giridharan, Bellevue, WA (US); Stefano Stefani, Issaquah, WA (US); Ming Xie, Sammamish, WA (US); Jia Bi Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 15/677,750

(22) Filed: Aug. 15, 2017

(51) Int. Cl.
G06F 16/14 (2019.01)
G06F 16/93 (2019.01)
G06F 16/23 (2019.01)

(52) U.S. Cl.
CPC .......... G06F 16/148 (2019.01); G06F 16/235 (2019.01); G06F 16/93 (2019.01)

(58) Field of Classification Search
CPC ....... G06F 16/148; G06F 16/93; G06F 16/235
USPC ....................................... 707/769
See application file for complete search history.

(56) References Cited

U.S. PATENT DOCUMENTS

| 6,418,437 | B1 * | 7/2002 | Cole | G06F 16/2358 |
| 6,418,469 | B1 * | 7/2002 | Justice, Jr. | H04L 41/0213 |
| | | | | 707/999.01 |
| 6,430,650 | B1 * | 8/2002 | Miyauchi | G06F 12/0292 |
| | | | | 711/103 |
| 6,983,322 | B1 * | 1/2006 | Tripp | G06F 16/951 |
| | | | | 709/225 |
| 7,103,589 | B1 * | 9/2006 | Kepler | G06F 16/2471 |
| | | | | 707/706 |
| 7,164,676 | B1 * | 1/2007 | Chakraborty | G06F 16/2386 |
| | | | | 370/368 |
| 7,287,048 | B2 * | 10/2007 | Bourbonnais | G06F 16/256 |
| 9,223,848 | B2 * | 12/2015 | Wilf | G06F 16/283 |
| 9,229,969 | B2 * | 1/2016 | Bestgen | G06F 16/2453 |
| 9,442,749 | B2 * | 9/2016 | Tang | H04L 67/101 |
| 9,898,501 | B2 * | 2/2018 | Bogrett | G06F 16/93 |
| 10,437,812 | B2 * | 10/2019 | Yamada | G06F 16/2358 |
| 2003/0035559 | A1 * | 2/2003 | Cohen | H04H 60/04 |
| | | | | 381/119 |

(Continued)

OTHER PUBLICATIONS

Kachemir et al., "Gloria: A Batch Friendly Indexing and Storage Framework", 2016, ACM, 10 pages printed (Year: 2016).*

Primary Examiner — Tony Mahmoudi
Assistant Examiner — Michael Le
(74) Attorney, Agent, or Firm — Lowenstein Sandler LLP

(57) ABSTRACT

A search management system and method to perform a search of first set of records maintained in a transactional data store (e.g., a commit log of a relational data store) and a second set of records maintained in a batch-updated data store. The search results corresponding to the transactional data store and the batch-updated data store are merged to generate a search result dataset to provide in response to a search query. The transactional layer or transaction data store is a commit log configured to manage and store records in accordance with recently executed operations (e.g., add and delete record operations) based on communications with one or more customer systems relating to customer data. Records maintained in the commit log are subsequently stored in the batch-updated data store as a result of a batching process.

20 Claims, 5 Drawing Sheets

(56) References Cited

U.S. PATENT DOCUMENTS

| | | | |
|---|---|---|---|
| 2005/0144189 A1* | 6/2005 | Edwards | G06F 16/185 |
| 2005/0182773 A1* | 8/2005 | Feinsmith | G06Q 10/10 |
| 2007/0136305 A1* | 6/2007 | Kelley | G06F 16/9562 |
| 2007/0299810 A1* | 12/2007 | Riedel | G06F 16/217 |
| 2008/0120710 A1* | 5/2008 | Holz | G06Q 10/08 |
| | | | 726/7 |
| 2009/0048941 A1* | 2/2009 | Strassmann | G06Q 30/02 |
| | | | 705/26.62 |
| 2009/0070337 A1* | 3/2009 | Romem | G06F 16/27 |
| 2009/0276473 A1* | 11/2009 | Fukuda | G06F 16/2393 |
| 2010/0004004 A1* | 1/2010 | Browne-Swinburne | H04W 4/029 |
| | | | 455/457 |
| 2010/0036851 A1* | 2/2010 | Paterson-Jones | G06F 3/067 |
| | | | 707/636 |
| 2010/0274759 A1* | 10/2010 | Takeuchi | G06F 16/275 |
| | | | 707/624 |
| 2011/0078675 A1* | 3/2011 | Van Camp | G06F 8/65 |
| | | | 717/170 |
| 2011/0246434 A1* | 10/2011 | Cheenath | G06F 16/2386 |
| | | | 707/703 |
| 2011/0313969 A1* | 12/2011 | Ramu | G06F 16/254 |
| | | | 707/602 |
| 2012/0041786 A1* | 2/2012 | Yu | G06F 19/321 |
| | | | 705/3 |
| 2013/0110767 A1* | 5/2013 | Tatemura | G06F 16/2379 |
| | | | 707/607 |
| 2013/0290380 A1* | 10/2013 | Flickner | H04N 21/4435 |
| | | | 707/803 |
| 2014/0136250 A1* | 5/2014 | Lee | G06Q 10/02 |
| | | | 705/5 |
| 2014/0156618 A1* | 6/2014 | Castellano | G06F 16/2358 |
| | | | 707/703 |
| 2014/0280293 A1* | 9/2014 | Scanlon | G06F 16/24552 |
| | | | 707/769 |
| 2015/0379517 A1* | 12/2015 | Jin | G06Q 20/4016 |
| | | | 705/44 |
| 2016/0179919 A1* | 6/2016 | Martin | G06F 16/242 |
| | | | 707/602 |
| 2016/0335311 A1* | 11/2016 | Frank | G06F 16/2379 |
| 2017/0031963 A1* | 2/2017 | Merz | G06Q 20/322 |
| 2017/0169493 A1* | 6/2017 | Florance | G06Q 30/0625 |
| 2018/0225331 A1* | 8/2018 | Agrawal | G06F 16/24549 |

* cited by examiner

TRANSACTIONAL AND BATCH-UPDATED DATA STORE SEARCH

BACKGROUND

Existing search systems include specialized hardware configured to perform runtime computations against a large number of documents in the dataset stored in specialized data structures in a batch-updated data store. For example, the batch-updated data store may be structured to store millions of faces each represented by feature vectors mapped into a 64-dimensional space. This data store may receive a query including a face and compare the face to the millions of faces stored in the data store. To do so, analysis of every candidate face stored in the data store (e.g., the calculation of a Euclidean distance computation for every candidate face and the associated feature vectors) is performed and takes on the order of 30 seconds.

In addition, when a document is submitted for addition to the batch-updated data store, the document is first indexed and added by a batch updated to the batch-updated data store before that document can appear in the search results. To this end, in a conventional system, newly indexed documents (e.g., document including new faces to be added to the data store) are not a part of the searchable batch-updated data store until a next batch-update occurs and completes. As such, if a new query is processed prior to the next batch update, all documents that were newly indexed (and not yet made part of the batch-updated data store) are not identifiable by a search.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
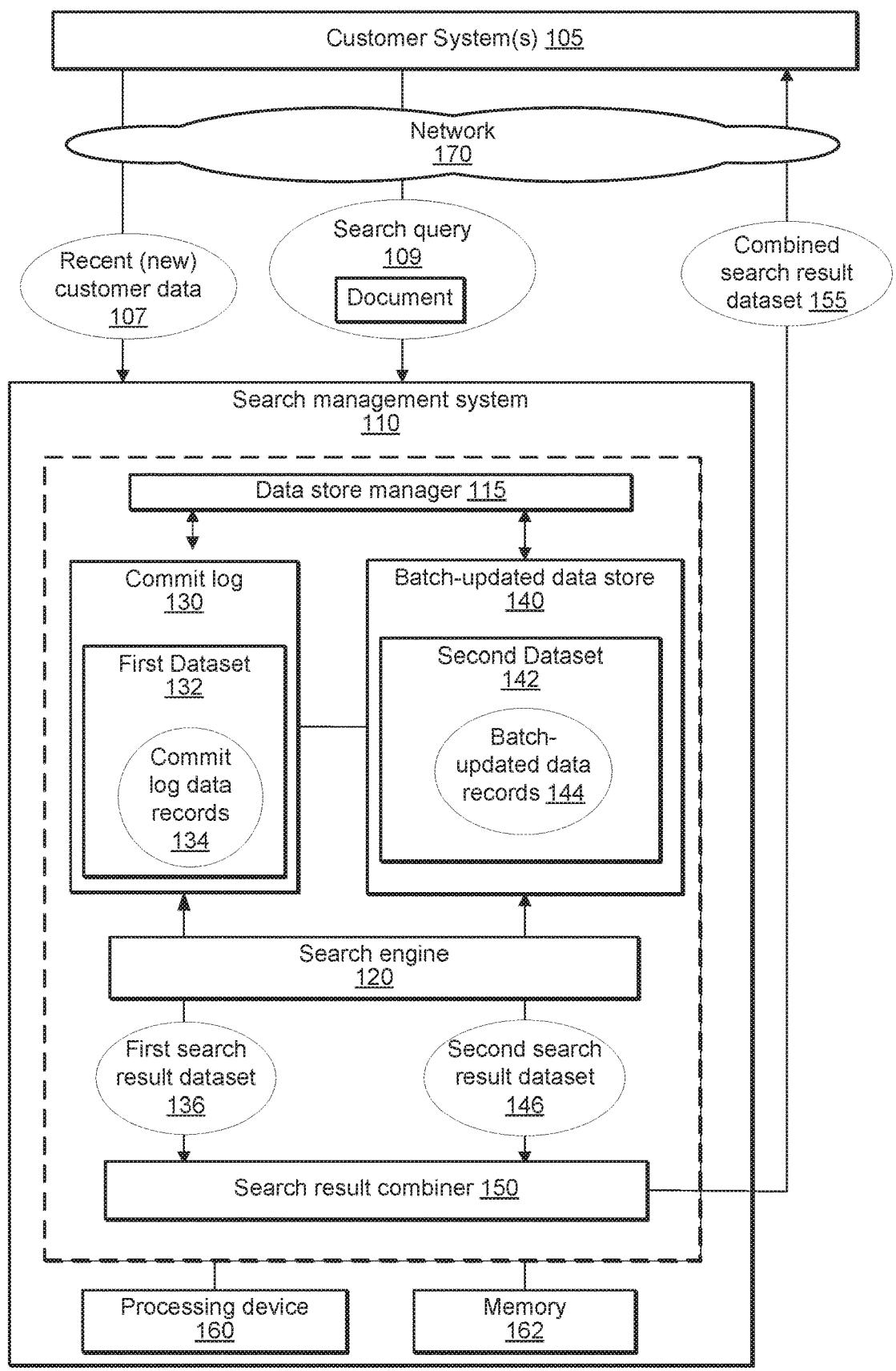
FIG. 1 illustrates an example environment including a search management system, according to one embodiment.

Embodiments described herein relate to a search management system to perform a search of a first set of records maintained in a transactional data store (e.g., a commit log) and a second set of records maintained in a batch-updated data store. In one embodiment, the search management system merges the search results corresponding to the transactional data store and the batch-updated data store to generate a search result dataset to provide in response to a search query. In one embodiment, the records stored in the commit log and the batch-updated data store correspond to data (e.g., documents to be indexed and searched) received from one or more customer systems.

In one embodiment, the transactional layer or transaction data store is a commit log configured to manage and store records in accordance with recently executed operations (e.g., add and delete record operations) based on communications with one or more customer systems relating to customer data. In one embodiment, records maintained in the commit log are provided to the batch-updated data store via a batching process. In one embodiment, the batching process may be initiated in response to reaching or exceeding a batch-update threshold. In one embodiment, the first set of records maintained by the commit log (or transactional data store) is relatively smaller than the set of records maintained by the batch-updated data store.

In one embodiment, during an asynchronous process running in the background, new customer data is received and added to the transactional data store to generate the first dataset. Upon reaching a batch-update threshold (e.g., a threshold size of the commit log or a threshold time limit corresponding to an amount of time a record is stored in the commit log), at least a portion of the contents of the first dataset are batched and added to the batch-updated data store. In one embodiment, the batch-updated data store is any suitable data store type, such as, for example, a database, a raw data structure server, or other data store including a data structure searchable using a k-Nearest Neighbor (kNN)-based search. In one embodiment, the batch-updated data store is a relational database (e.g., Amazon Aurora® database). In one embodiment, the batch-updated data store is a MySQL and PostgreSQL compatible. In one embodiment, the batch-updated data store includes a read-only kNN search index.

In one embodiment, in response to a query including search criteria, the search management system performs a search of the commit log and the batch-updated data store to identify one or more records satisfying the search criteria. In one embodiment, in view of the relative size of the set of records maintained by the commit log, a portion of the search against the commit log may be performed quickly and may capture data that is then currently undergoing batch-updating to the batch-updated data store.

In one embodiment, the commit log includes recently executed operations relating to the data store records (e.g., a record of transactions including the addition and deletion of data store records) against which a real-time search is performed upon receipt of a query.

In one example, a customer may submit multiple documents including faces to be indexed and added to the searchable data stores of the search management system. In one embodiment, the customer data (e.g., one or more documents, such as images) is first maintained in the commit log, until a batch update is performed and the records associated with the customer data are replicated or moved from the commit log to the batch-updated data store. In one example, at a given point in time, the commit log stores multiple records relating to customer data that results from recently performed transactions (e.g., transactions that have occurred since the last batch update completed). These transactions may include adding records or deleting records.

In one embodiment, the search management system includes a search engine configured to receive and analyze a search query including search criteria (e.g., a document including an image of an object, such as a face) to identify a search result dataset including one or more search results (e.g., entries in the commit log and batch-updated data store that match the search criteria). In one embodiment, the search engine extracts one or more features from the search criteria (e.g., the document) to compare to stored records in a dataset of the commit log. For example, a feature vector may be generated from a received document, and the feature vector may be compared to feature vectors of stored documents. The comparison may be performed, for example, using a kNN search. In one embodiment, the search engine concurrently performs a search and analysis of the stored records in a dataset of the batch-updated data store. In one embodiment, the extracted features of the query are used in a multi-faceted search of the commit log and the batch-updated data store.

Advantageously, in one embodiment, a transactional search index (e.g., a kNN search index) is provided that includes a batch-updated data store (e.g., a read-only kNN search indexed data store) combined with a commit log configured to store document deltas (e.g., recent transactions relating to changes or updates to data provided by one or more customer systems). In one embodiment, operations are performed to generate a search result dataset for provisioning in response to a customer query that includes search result data from the commit log merged with search result data from the batch-updated data store.

In the following discussion, embodiments of the system and its components are described. Although the description includes certain examples relating to the management of data stores and search functionality, it is to be appreciated that the systems and methods described herein are not limited to the enumerated examples.

FIG. 1 illustrates an example of an environment including a search management system 110 configured to manage indexed and searchable data stores storing data received via a network 170 from one or more customer systems 105. In one embodiment, the search management system 110 includes a data store manager (also referred to as a data store management system (DBMS)) 115, a search engine 120, and a search result combiner 150 configured to perform functionalities associated with the management of a first dataset maintained by a transactional data store 130 and a second dataset 142 maintained by a batch-updated data store 140. In one embodiment, the search management system 110 is a network-based service that is communicatively coupled to the one or more customer systems 105 (e.g., one or more computing devices) via a suitable network 170, including, for example, the Internet, intranets, extranets, wide area networks (WANs), local area networks (LANs), wired networks, wireless networks, or other suitable networks, etc., or any combination of two or more such networks. In one embodiment, the search management system 110 includes a processing device 160 and a memory 162 configured to execute and store instructions associated with the functionality of the various components, services, and modules of the search management system 110, as described in detail herein in connection with FIGS. 1-5.

In one embodiment, the search management system 110 is configured to receive data (e.g., customer data) 107 from the one or more customer systems 105. In one embodiment, the data 107 may include any suitable data to be indexed and searchable via the search management system 110. In one example, the data 107 may include one or more documents, images, videos, files, or the like. In one example, the data 107 may include one or more objects (e.g., faces) to be detected, indexed, stored, and searched.

In one embodiment, the data store manager 115 is configured to receive the data 107 and add the data 107 to the transactional data store 130. In one embodiment, the transactional data store 130 is a commit log configured to store data corresponding to recently executed transactions initiated by the one or more customer systems 105. In one embodiment, the recently executed transactions may include transactions associated with the addition and deletion of one or more records associated with the data 107 (i.e., the commit log data records 134). In one embodiment, the commit log 130 indexes and stores the commit log data records 134 associated with the "recent" or "new" data 107 received from the customer system 105 which has not yet been added to the batch-updated data store 140 by way of a batch update.

In one embodiment, the commit log data records 134 are transitioned from the commit log 130 to the batch-updated data store 140 by one or more batch updates. In one embodiment, following the batch updating of the batch-updated data store 140, the commit log data records 134 are stored by the batch-updated data store 140 as a second dataset 142 including batch-updated data records 144. In one embodiment, following the completion of multiple batch updates, a size of the batch-updated data records 144 increases and is larger than the commit log data records 134.

In one embodiment, the search engine 120 may receive a search query 109 from the customer system(s) 105. In one embodiment, the search query 109 may include search criteria to be analyzed by the search engine 120 to identify one or more matching records stored in the commit log 130 and the batch-updated data store 140. In one embodiment, the search query 109 may include a document including an object (e.g., a face) that is analyzed by the search engine 120 to identify one or more records corresponding to objects that satisfy the matching criteria, according to any suitable searching and matching algorithm or methodology.

In one embodiment, the search engine 120 concurrently performs a search of the commit log 130 and the batch-updated data store 140 to identify a first search result dataset 136 including records stored in the commit log 130 and a second search result dataset 146 including records stored in the batch-updated data store 140. In one embodiment, the first search result dataset 136 and the second search result dataset 146 are provided to the search result combiner 150.

In one embodiment, the search result combiner 150 merges or combines the first search result dataset 136 and the second search result dataset 146 to produce a combined search result dataset 155 to return in response to the search query 109. In one embodiment, a record that is in the process of being batched from the commit log 130 to the batch-updated data store 140 may appear in both data stores. For example, a batch update may be in progress such that a record is stored in the batch-updated data store 140 but the acknowledgment of completion of the batch update has not been provided by the batch-updated data store 140 to the commit log 130. Accordingly, in this example, at this stage (prior to completion of the batch update), the one or more records may be stored in both the first dataset 132 of the commit log 130 and the second dataset 142 of the batch-updated data store 140.

In one embodiment, the search result combiner 150 may delete or remove one or more records returned in the second search result dataset 146 that have been deleted, according to a delete record transaction stored in the commit log 130. In this example, a record that has been deleted by a delete transaction (e.g., a "delete record transaction") initiated by a customer system 105 may be identified in the commit log data records 134. Prior to the completion of a next batch update, this delete record transaction has not yet been reflected in the batch-updated data records 144, and as such, the record identified for deletion may be included in the second search result dataset 146. In this example, the search result combiner 150 identifies the delete record transaction stored in the commit log 130 and removes the corresponding record from the second search result dataset 146.

In one embodiment, the commit log 130 stores a table (or other suitable structure) that tracks newly added and deleted records. In one embodiment, the data store manager 115 periodically scans the table to identify unindexed records and submits those records a batch indexing jobs or transactions into the batch-updated data store 140. In one embodiment, each record in the commit log 130 is assigned a unique sequence number that operates as a watermark or signature for the respective record. In one embodiment, the sequence number is a monotonically increasing sequence number. In one embodiment, the commit log 130 maintains an ordered structure of records to enable the indexing and deleting of records corresponding to the data 107.

In one embodiment, records may be maintained in the commit log 130 until a batch-update threshold is reached. In one embodiment, the batch-update threshold may be a maximum size or quantity of records to be maintained in the commit log 130 (i.e., a commit log size threshold). In one embodiment, the batch-update threshold may be represented by a maximum amount of time it takes for the commit log 130 to return search results in response to a search query 109. In this example, if the amount of time it takes the commit log 130 to return data to the search engine 120 to formulate the first search result dataset 136 exceeds the threshold time, then a batch update is initiated to "empty" the commit log 130.

In one embodiment, the batch update may be initiated in response to exceeding a batch-update threshold corresponding to a maximum quantity of delete transactions or deletes in the commit log 130. In one embodiment, a request to initiate a batch update may be submitted to the batch-updated data store 140 by the commit log 130. While the batch-update job is in progress, the commit log 130 does not perform operations relating to the records undergoing the batching. In one embodiment, upon completion of the batch update job, one or more changes made by the customer system 105 are tracked and merged into the batch-updated data store 140 by the data store manager 115.

In one embodiment, during the phase when the batch update has been initiated and before the batch-updated data store provides a notification that the records have been indexed, there are two copies of the records (one in the commit log 130 and one in the batch-updated data store 140). In one example, during this phase, a search may be performed by querying the commit log 130 and receiving a first search result dataset (e.g., 10 records). In this example, the batch-updated data store 140 is also queried and a second search result dataset 146 including the same 10 records may be received. In this case, the first search result dataset 136 (from the commit log 130) and the second search result dataset 146 (from the batch-updated data store 144) are joined and de-duplicated by the search result combiner 150 to produce the combined search result dataset 155, such that it appears to the customer system 105 as though the combined search result dataset 155 came from a single source.

Advantageously, records corresponding to the new or recent data 107 are assigned a sequence identifier and stored in a searchable table maintained by the commit log 130. In one embodiment, a search of the commit log 130 produces the first search result dataset 136 to be combined with the second search result dataset 146 derived from searching the batch-updated data store 140. In one embodiment, the search engine 120 is configured to perform any suitable searching algorithm, including, for example, a kNN search.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to the use of a server is merely by way of example, and other suitable computing devices known to those of skill in the art may be employed.

Figure 2:
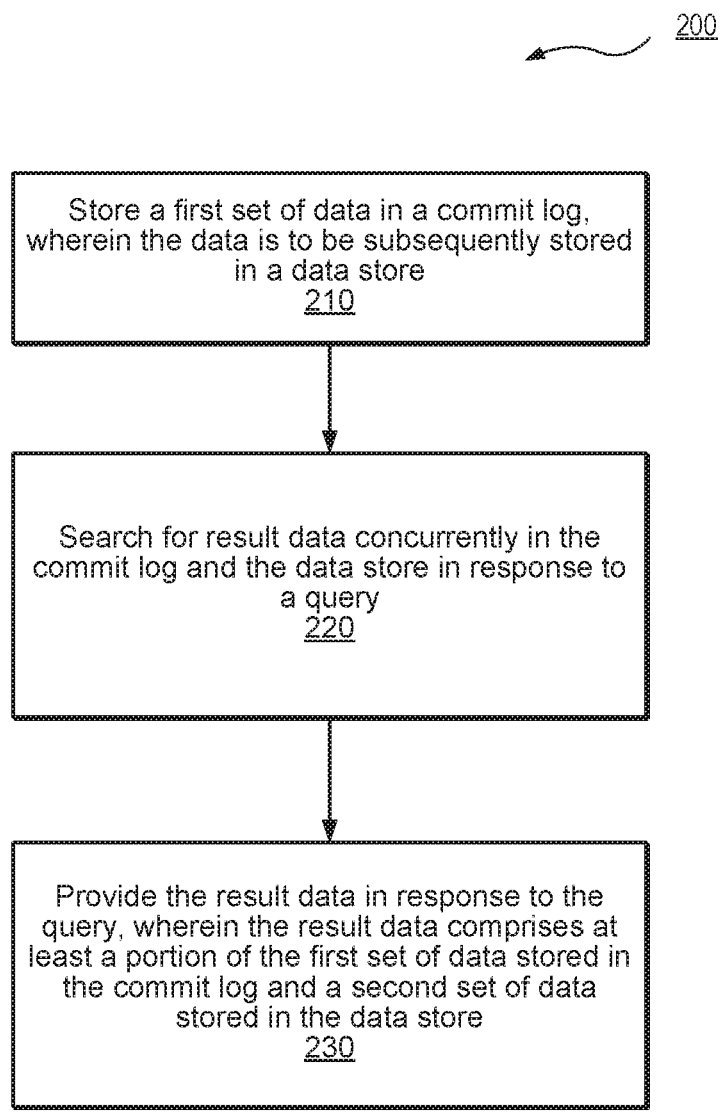
FIG. 2 depicts a flowchart illustrating an example of functionality implemented by a search management system, according to one embodiment.

FIG. 2 illustrates a flowchart that provides an example of a process 200 executed by a search management system (e.g., search management system 110 of FIG. 1), according to various embodiments of the present disclosure. It is understood that the flowchart of FIG. 2 provides an example of the many different types of functional arrangements that may be employed to implement the operation of the search management system 110 as described herein. Process 200 may be performed by a processing logic that may comprise hardware (e.g., circuitry, dedicated logic, programmable logic, microcode, etc.), software (e.g., instructions run on a processing device), or a combination thereof.

In block 210, a first set of data is stored in a commit log. In one embodiment, the first set of data is subsequently stored in another data store (e.g., a batch-updated data store). In one embodiment, the first set of data includes one or more records corresponding to data received from one or more customer systems. In one example, the first set of data may include records associated with one or more documents submitted by a customer system for inclusion in a searchable data store. In one embodiment, the records include information representing the documents, such as a multi-dimensional representation of at least a portion of the document that may be used in comparing the record to search criteria corresponding to a search query.

In block 220, in response to a query, a search for result data is concurrently performed in the commit log and the data store. In one embodiment, the query includes search criteria that analyzed by a search engine to identify one or more matching records in the commit log and the data store (e.g., a batch-updated data store).

In block 230, the result data is provided in response to the query. In one embodiment, the result data includes combined results from the respective searches of the commit log and the data store. In one embodiment, the result data includes at least a portion of the first set of data stored in the commit log and a second set of data stored in the data store. In one embodiment, the result data represents a merger of the first set of data and the second set of data including any changes made to the second set of data due to changes or updates (e.g., add and delete record transactions) tracked by the commit log. In one embodiment, the result data includes updates resulting from the de-duplication of records appearing in both the first set of data and the second set of data.

Figure 3:
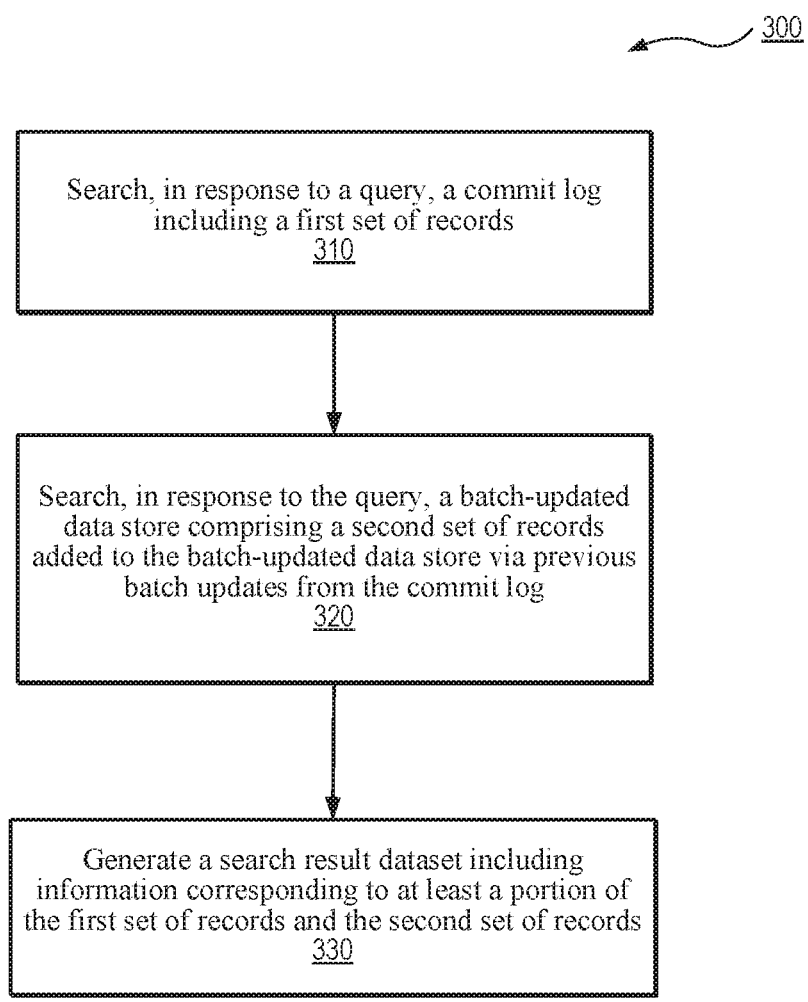
FIG. 3 depicts a flowchart illustrating an example of functionality implemented by a search management system, according to one embodiment.

FIG. 3 illustrates a flowchart that provides an example of a process 300 executed by a search management system (e.g., search management system 110 of FIG. 1), according to various embodiments. It is understood that the flowchart of FIG. 3 provides an example of the many different types of functional arrangements that may be employed to implement the operation of the search management system as described herein. Process 300 may be performed by a processing logic that may comprise hardware (e.g., circuitry, dedicated logic, programmable logic, microcode, etc.), software (e.g., instructions run on a processing device), or a combination thereof.

In block 310, in response to a query, a search of a commit log including a first set of records is performed. In one embodiment, the query may include search criteria that is analyzed and compared to data in the first set of records. In one embodiment, the first set of records is maintained in tabular form in the commit log. In one embodiment, each of the records is identifiable by a unique sequence number. In one embodiment, the sequence number is a monotonically increasing sequence number sequence number that serves as a watermark or signature for the record that may be used in indexing and searching.

In block 320, in response to the query, a search of a batch-updated data store including a second set of records is performed. In one embodiment, the second set of records have been added to the batch-updated data store from the commit log via one or more previous batch updates. In one embodiment, the second set of records, maintained by the batch-updated data store, includes a larger quantity of records than the first set of records maintained by the commit log.

In one embodiment, the first set of records is smaller in quantity than the second set of records. In one embodiment, over a period of time, multiple sets of data maintained in the commit log are subsequently batched to the batch-updated data store and removed from the commit log. In one embodiment, the first set of records includes new data that has recently been introduced by the one or more customer systems (i.e., transactions that have occurred since the completion of a previous batch update). In one embodiment, records in the first set of records are subsequently sent from the commit log to the batch-updated data store via one or more batch updates. In one embodiment, the batch updates include indexing operations to index records from the batch updates.

In block 330, a search result dataset is generated, in response to the query. In one embodiment, the search result dataset includes information corresponding to at least a portion of the first set of records and the second set of records. In one embodiment, the search result dataset represents the combing or merging of the records identified via the respective searches of the commit log and the batch-updated data store. In one embodiment, the search result dataset is represented by the following expression:

Search result dataset=[Batch-updated search results]−[Commit log delete records]+[Commit log index/add records]

In one embodiment, in a kNN search implementation, the variable k represents a result set size corresponding to a customer system. In one embodiment, multiple variations of k are employed when searching the commit log (e.g., a relational data store such as an Amazon Aurora data store) and the batch-updated data store (e.g., a kNN-based data store). For example, k' is a value corresponding to a query of the batch-updated data store and k" is a value corresponding to a query of the commit log. In one embodiment, the values of k' and k", in the absence of delete record transactions, may be represented by the following exemplary expression:

$k=k'+k''$=API limit (e.g., 4,096 records).

In one embodiment, when delete record transactions are present, k' varies with the quantity of deletes in the batch indexing job, resulting in the following expression:

$k'=k$+a multiple of a number of deletes in the commit log

In one example, a customer system may add 20,000 new documents to the search management system. In this example, subsequently, the 20,000 records are successfully added to the batch-updated data store via a batch update. Next, the customer system deletes 10,000 records and a new batch update job is submitted. While the new batch indexing job is in progress (e.g., not yet completed), a customer system submits a search query for a kNN search, where k=4,096. At this stage, the batch-updated data store may return results including all of the 10,000 records that have been deleted, in which case:

$k'=4,096+$(selected multiplier×10,000)=24,096 records, wherein the selected multiplier equals 2.

In this example, the batch-updated data store provides at least 4,096 undeleted records in the search result dataset which can be merged with the results from the commit log in the query result merging process performed by the search management system. In one embodiment, the search management system may be configured to return a search result dataset that includes a factor or multiplier (e.g., a factor of 2, 4, 6, 8, etc.) greater than k. For example, search management system may be configured to return a search result dataset that includes 2 times k, 3 times k, etc. In one example, for k=2, the search result dataset may include 4 results.

Figure 4:
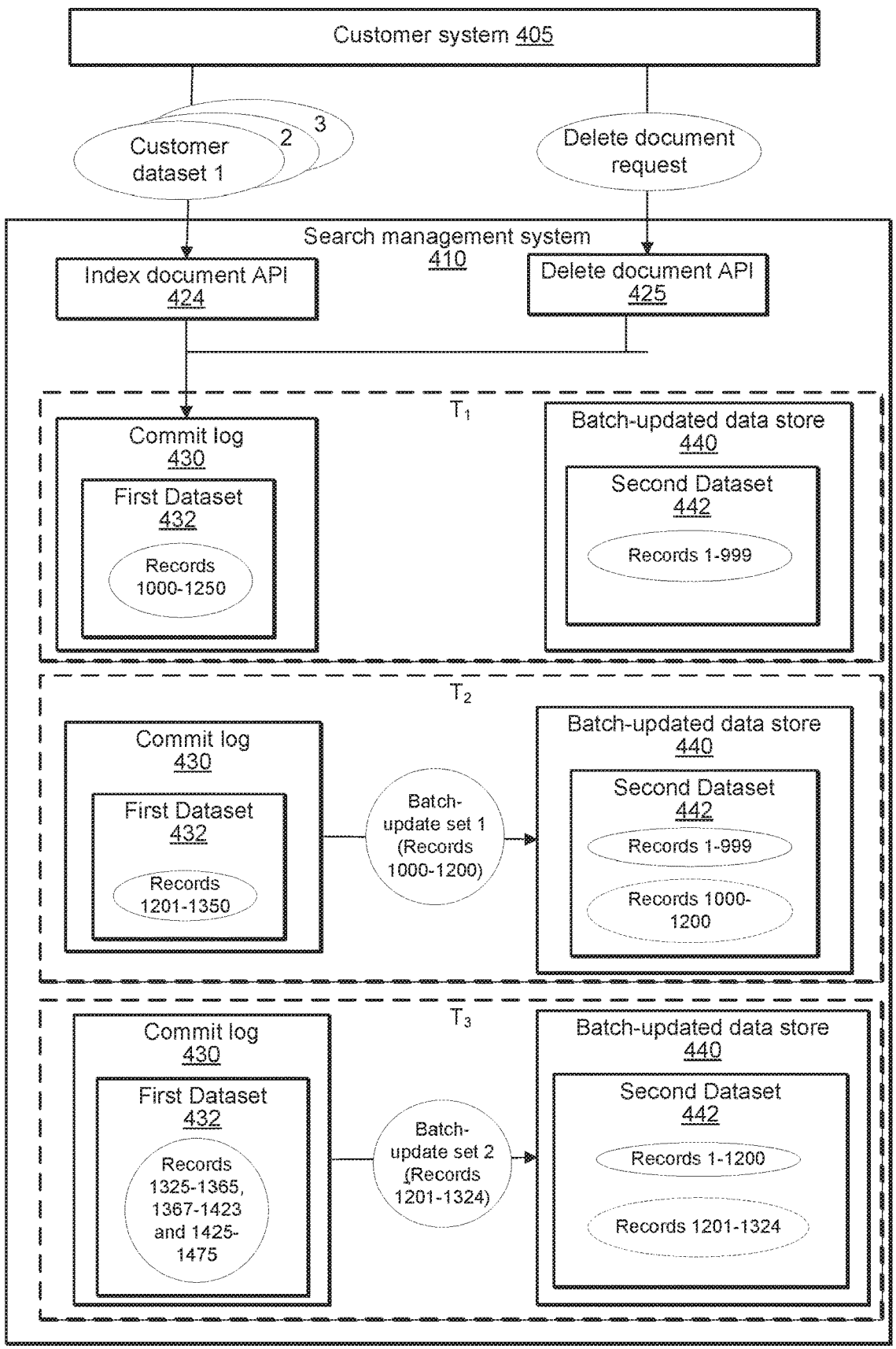
FIG. 4 illustrates an example search management system managing a commit log and batch-updated data store, according to one embodiment.

FIG. 4 presents a schematic diagram illustrating exemplary processing performed by a search management system 410, according to embodiments of the present disclosure. In FIG. 4, the operating states of a computing environment at various times during the management of a commit log 430 and a batch-updated data store 440 relating to the adding (indexing) and deleting of records pursuant to data received from a customer system 405. As shown in FIG. 4, the search management system 410 may include an index document application programming interface (API) 424 and a delete document API 425. In one embodiment, the index document API 424 is configured to receive and process instructions to add a document or record to the commit log 430 and the batch-updated data store 440. In one embodiment, the delete document API 425 is configured to receive and process instructions to delete one or more documents or records from the commit log 430 and the batch-updated data store 440.

As shown in FIG. 4, in a first state (at a first time identified as $T_1$), the commit log 430 maintains a first dataset 432 including records 1000-1250 corresponding to one or more of the customer datasets (e.g., customer dataset 1) received via the index document API 424 and delete operations received via the delete document API 425. In this first state, at $T_1$, the batch-updated data store 440 maintains a second dataset 442 including records 1-999 (previously stored as a result of one or more batch updates received from the commit log 430).

At a second time ($T_2$), a batch update or batch indexing job is executed to update the batch-updated data store 440 to include the batch-update set 1 (records 1000-2000). In one embodiment, the batch indexing job may be initiated upon reaching or exceeding the batch-update threshold. In one example, the batch-update threshold may be a desired result return time corresponding to an amount of time it takes for search result to be returned by the commit log 430, as described in detail above. In one embodiment, the batch-update threshold may be threshold quantity of deletes in the commit log 430. As illustrated, at $T_2$, following completion of the batch update (moving of batch-update set 1 to the batch-updated data store 440), the first dataset 432 removes records 1000-1200 and maintains records 1201-1350, wherein records 1251-1350 correspond to a subsequent customer dataset received from the customer system 405 (e.g., customer dataset 2) and delete transactions received via the delete document API 425. In one embodiment, following completion of the batch update, the second dataset 442 includes records 1-1200 (the original set of records 1-999 and newly added records 1000-1200).

At a third time ($T_3$), a next batch update or batch indexing job is executed to update the batch-updated data store 440 to include the batch-update set 2 (records 1201-1324). As illustrated, at $T_3$, following completion of the batch update (moving of batch-update set 2 to the batch-updated data store 440), the first dataset 432 removes records 1201-1324 and maintains records 1325-1365, 1367-1423 and 1425-1475, wherein the maintained records correspond to a subsequent customer dataset received from the customer system 405 (e.g., customer dataset 2) and delete transactions (e.g., the deletion of records 1366 and 1424) received via the delete document API 425. In one embodiment, following completion of the batch update, the second dataset 442 includes records 1-1324. As illustrated, the add and delete transactions are managed and reflected in the commit log 430 to enable the merging process with search results returned from the batch-updated data store 440 in response to a query.

Figure 5:
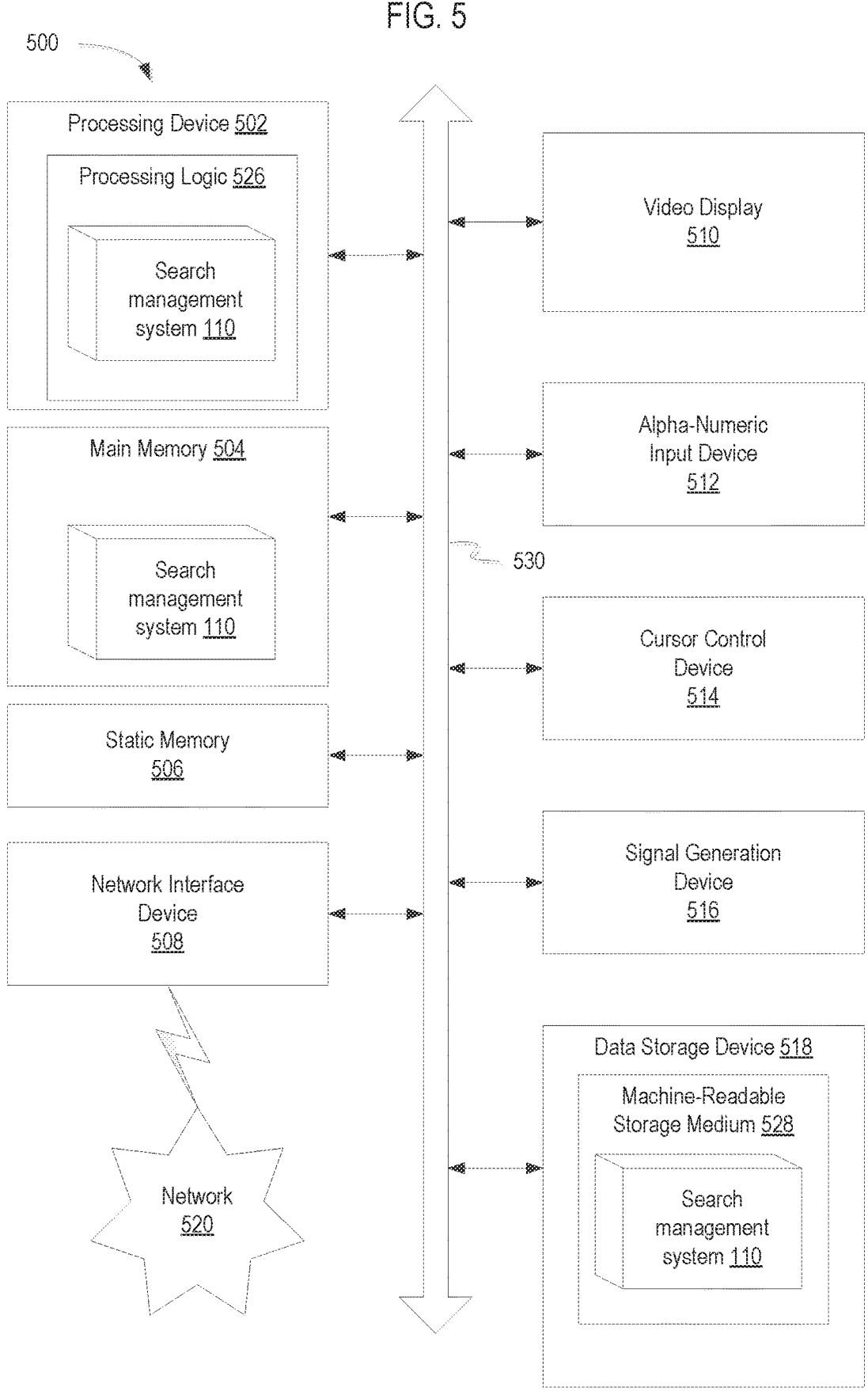
FIG. 5 is a schematic block diagram that provides an example illustration of a computing environment executing instructions relating to search management, according to one embodiment.

FIG. 5 illustrates a diagrammatic representation of a machine in the example form of a computer system 500 within which a set of instructions 550, for causing the machine to perform any one or more of the methodologies discussed herein, may be executed. In one embodiment, the instructions 550 may enable execution of and the functionality described in connection with FIG. 1-4 (e.g., process 200 of FIG. 2 and process 300 of FIG. 3) by a search management system (e.g., the search management system 110 in FIG. 1).

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. In one embodiment, computer system 500 may represent the search management system 110 of FIG. 1 and the search management system 410 of FIG. 4.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for a search management system for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium on which is stored one or more sets of instructions of the search management system 110 embodying any one or more of the methodologies or functions described herein. The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed data store, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely presented as examples. Particular implementations may vary from these example details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "initiating", "determining", "updating", "storing", "causing", "identifying", "comparing", "transferring", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   searching, in response to a query, a commit log comprising a first set of records comprising one or more individual executed transactions initiated by a system;
   upon completion of the searching of the commit log, determining an amount of time to retrieve at least a first portion of the first set of records from the commit log exceeds a threshold amount of time;
   searching, in response to the query, a batch-updated data store comprising a second set of records added to the batch-updated data store via previous batch updates from the commit log;
   generating a search result dataset comprising the at least the first portion of the first set of records merged with at least a second portion of the second set of records; and
   following the generating of the search result dataset, in response to determining the amount of time exceeds the threshold amount of time:
      performing a batch update of the first set of records from the commit log to the batch-updated data store; and
      deleting the first set of records from the commit log.

2. The method of claim 1, wherein the second set of records comprises a first record, the method further comprising:
   prior to searching the commit log, receiving, by the commit log, a delete transaction identifying the first record to be deleted; and
   removing the first record from the search result dataset.

3. The method of claim 1, wherein generating the search result dataset comprises removing a duplicate record appearing in the at least the first portion of the first set of records and the at least the second portion of the second set of records.

4. The method of claim 1, further comprising executing, by the commit log, a further batch update in response to exceeding a batch-update threshold, wherein executing the further batch update comprising identifying a plurality of records to be stored in the batch-updated data store; and
   removing the plurality of records from the commit log in response to completion of the further batch update.

5. A system comprising:
   a processing device; and
   a computer-readable memory to store computer-executable instructions that, if executed, cause the processing device to:
      store a first set of data in a commit log, wherein the first set of data is to be subsequently stored in a data store, and wherein the first set of data comprises one or more individual transactions associated with a customer system;
      search for result data concurrently in the commit log and the data store in response to a query;
      upon completion of the search of the commit log, determine an amount of time to retrieve at least a first portion of the first set of data from the commit log exceeds a threshold amount of time;
      provide the result data in response to the query, wherein the result data comprises the at least the first portion of the first set of data stored in the commit log merged with at least a second portion of a second set of data stored in the data store; and
      following providing the result data, in response to the determination that the amount of time exceeds the threshold amount of time:

perform a batch update of the first set of data from the commit log to the data store; and delete the first set of data from the commit log.

6. The system of claim 5, the processing device to:
identify a third set of data stored in the commit log;
execute a further batch update to store the third set of data in the data store; and
remove the third set of data from the commit log in response to completion of the further batch update.

7. The system of claim 5, the processing device to:
wherein the merging comprises removing a duplicate record appearing in the at least the first portion of the first set of data and the at least the second portion of the second set of data.

8. The system of claim 5, the processing device to:
identify one or more changes to the first set of data; and
update the first set of data to incorporate the one or more changes.

9. The system of claim 8, wherein the one or more changes comprises a deletion of a first record stored in the commit log.

10. The system of claim 9, the processing device to:
determine the at least the second portion of the second set of data comprises the first record; and
remove, from the result data, the first record from the at least the second portion of the second set of data.

11. The system of claim 5, wherein the first set of data comprises a plurality of records, wherein each of the plurality of records is associated with a monotonically increasing sequence number.

12. The system of claim 5, the processing device to:
cause the commit log to execute a further batch update in response to exceeding a batch-update threshold, wherein the further batch update comprises a plurality of records to be stored in the data store.

13. The system of claim 12, wherein the batch-update threshold comprises at least one of a first quantity of records stored in the commit log or a maximum quantity of time at least one record is stored in the commit log.

14. The system of claim 5, wherein the data store comprises an index searchable using a k-Nearest Neighbor (kNN)-based search.

15. The system of claim 14, wherein a value of k is established by multiplying a customer-selected value by a factor.

16. A non-transitory computer-readable storage device storing computer-executable instructions that, if executed by a processing device, cause the processing device to:
store a first set of data in a commit log, wherein the first set of data is to be subsequently stored in a batch-updated data store and removed from the commit log;
search the commit log in response to a query to identify a first search result dataset associated with the first set of data;
upon completion of the search of the commit log, determine an amount of time to retrieve the first search result set from the commit log exceeds a threshold amount of time;
search the batch-updated data store in response to the query to identify a second search result dataset associated with a second set of data stored in the batch-updated data store;
merge the first search result dataset and the second search result dataset to generate result data;
provide the result data in response to the query; and
following providing the result data, in response to the determination that the amount of time exceeds the threshold amount of time:
perform a batch update of the first set of data from the commit log to the data store; and
delete the first set of data from the commit log.

17. The non-transitory computer-readable storage device of claim 16, the processing device to
identify one or more changes to the first set of data; and
update the first set of data stored in the commit log to incorporate the one or more changes.

18. The non-transitory computer-readable storage device of claim 17, wherein the one or more changes comprises an addition of a first new record.

19. The non-transitory computer-readable storage device of claim 18, wherein the first search result dataset comprises the first new record.

20. The non-transitory computer-readable storage device of claim 16, wherein the batch-updated data store comprises a read-only index searchable using a k-Nearest Neighbor (kNN)-based search.

\* \* \* \* \*